United States Patent
Ijiri

(10) Patent No.: US 11,420,325 B2
(45) Date of Patent: Aug. 23, 2022

(54) METHOD, APPARATUS AND SYSTEM FOR CONTROLLING A ROBOT, AND STORAGE MEDIUM

(71) Applicant: OMRON Corporation, Kyoto (JP)

(72) Inventor: Yoshihisa Ijiri, Tokyo (JP)

(73) Assignee: OMRON Corporation, Kyoto (JP)

( * ) Notice: Subject to any disclaimer, the term of this patent is extended or adjusted under 35 U.S.C. 154(b) by 166 days.

(21) Appl. No.: 16/970,374

(22) PCT Filed: Mar. 5, 2018

(86) PCT No.: PCT/IB2018/051395
§ 371 (c)(1),
(2) Date: Aug. 16, 2020

(87) PCT Pub. No.: WO2019/171123
PCT Pub. Date: Sep. 12, 2019

(65) Prior Publication Data
US 2021/0086352 A1 Mar. 25, 2021

(51) Int. Cl.
*B25J 9/16* (2006.01)
*G06F 17/15* (2006.01)

(52) U.S. Cl.
CPC ............ *B25J 9/161* (2013.01); *B25J 9/1697* (2013.01); *G06F 17/15* (2013.01)

(58) Field of Classification Search
CPC .......... B25J 9/161; B25J 9/1697; G06F 17/15
USPC .................................................. 700/245–264
See application file for complete search history.

(56) References Cited

U.S. PATENT DOCUMENTS

| | | | | |
|---|---|---|---|---|
| 5,086,479 A | * | 2/1992 | Takenaga | G06N 3/0454 706/20 |
| 5,107,454 A | * | 4/1992 | Niki | G06N 3/0445 706/18 |
| 5,129,039 A | * | 7/1992 | Hiraiwa | G06N 3/082 706/30 |

(Continued)

FOREIGN PATENT DOCUMENTS

| | | |
|---|---|---|
| JP | 2017030135 | 2/2017 |
| JP | 2017033526 | 2/2017 |

OTHER PUBLICATIONS

Haididi et al, Distributed perception by collaborative robots, 2018, IEEE Robotics and Automation Letters, vol. 3, No. 4, Oct. 2018, pp. 3709-3716 (Year: 2018).*

(Continued)

*Primary Examiner* — Jaime Figueroa
(74) *Attorney, Agent, or Firm* — JCIPRNET

(57) ABSTRACT

The present disclosure relates to a method, an apparatus and a system for controlling a robot, and a storage medium. The method uses a neural network connected to an external memory to conduct the controlling of the robot, and comprises: inputting input data into the learned neural network to obtain output data, wherein said input data comprises an image about an object, said output data comprises control data about said robot; and establishing an association between part or all of the information generated by said neural network during the calculation and said input data and/or said output data, wherein said part or all of the information represents a feature of said object related to said control data. Thus, the user can grasp the calculation process of the neural network.

17 Claims, 8 Drawing Sheets

(56) References Cited

U.S. PATENT DOCUMENTS

| | | | | |
|---|---|---|---|---|
| 5,136,687 | A | * | 8/1992 | Edelman .................. G06N 3/04 706/15 |
| 5,321,795 | A | * | 6/1994 | Alvarez de Toledo ...................... G05D 1/0221 706/14 |
| 5,845,050 | A | * | 12/1998 | Sekiguchi ............ G06N 3/0427 382/153 |
| 10,933,530 | B2 | * | 3/2021 | Goldberg ............... B25J 9/1669 |
| 11,065,762 | B2 | * | 7/2021 | Sakai ..................... B25J 9/1661 |
| 2019/0147319 | A1 | * | 5/2019 | Kim ..................... G06N 3/0454 706/15 |
| 2019/0147327 | A1 | * | 5/2019 | Martin .................... G06F 17/15 706/15 |
| 2019/0210223 | A1 | * | 7/2019 | Goldberg ............... B25J 9/1669 |
| 2019/0270200 | A1 | * | 9/2019 | Sakai ................. G05B 19/4182 |
| 2020/0061811 | A1 | * | 2/2020 | Iqbal ..................... B25J 9/1612 |

OTHER PUBLICATIONS

Schmidt et al, Grasping of Unknown Objects using Deep Convolutional Neural Networks based on Depth Images, 2018, IEEE International Conference on Robotics and Automation (ICRA) May 21-25, 2018, Brisbane, Australia, pp. 6831-6838 (Year: 2018).*

Asif et al, RGB-D Object Recognition and Grasp Detection Using Hierarchical Cascaded Forests, 2017, IEEE Transactions on Robotics, vol. 33, No. 3, Jun. 2017, pp. 547-564 (Year: 2017).*

Wikipedia, "Artificial neural network-Wikipedia", Mar. 1, 2018, Available at: https://en.wikipedia.org/w/index.php2title=Artificial neural network&oldid=828287834.

Matthew D Zeiler et al., "Visualizing and Understanding Convolutional Networks", CORR(ARXIV), vol. 13112901V3, Nov. 28, 2013, pp. 1-11.

Li Yang Ku et al., "Associating Grasp Configurations with Hierarchical Features in Convolutional Neural Networks", 2017 IEEE/RSJ International Conference on Intelligent Robots and Systems (IROS), Sep. 2017, pp. 2434-2441.

"International Search Report (Form PCT/ISA/210) of PCT/IB2018/051395", dated Nov. 23, 2018, pp. 1-3.

"Written Opinion of the International Searching Authority (Form PCT/ISA/237) of PCT/IB2018/051395", dated Nov. 23, 2018, pp. 1-9.

"Office Action of Japan Counterpart Application" with English translation thereof, dated Febuary 8, 2022, p. 1-p. 11.

* cited by examiner

METHOD, APPARATUS AND SYSTEM FOR CONTROLLING A ROBOT, AND STORAGE MEDIUM

CROSS-REFERENCE TO RELATED APPLICATION

This application is a 371 application of the international PCT application serial no. PCT/IB2018/051395, filed on Mar. 5, 2018. The entirety of each of the above-mentioned patent applications is hereby incorporated by reference herein and made a part of this specification.

TECHNICAL FIELD

The present disclosure relates to a method, an apparatus and a system for controlling a robot, and a storage medium.

BACKGROUND

In order to control a robot based on production engineering, it is considered to use artificial intelligence technology that has utilized a neural network or the like to conduct the controlling of the robot. In order to achieve the desired control, the neural network performs learning based on learning data, and the neural network that has learned outputs control data according to input data such as an image of an object so as to control the robot to perform a desired operation on the object.

In addition, it is necessary to determine the attribute of the object in the production process, for example, the attribute indicates whether the object is a good product or a defective product, and such determination may also be realized by using artificial intelligence technology that has utilized a neural network or the like to conduct image recognition of the object.

SUMMARY

Problems to be Solved by the Invention

However, when an undesired operation is performed by the robot, it is unclear to a user how the learned neural network output such an unexpected control data. The controlling of the robot cannot be improved since the calculation process of the neural network is not known by the user.

The present disclosure has been made to solve at least some of the problems described above.

Means to Solve the Problems

According to an aspect of the embodiments of the present disclosure, there is provided a method for controlling a robot, using a neural network connected to an external memory to conduct the controlling of said robot, the method characterized by comprising: inputting input data into said learned neural network to obtain output data through a calculation by said neural network, wherein said input data comprises an image about an object, said output data comprises control data about said robot, and said robot controls said object based on said control data; and establishing an association between part or all of the information generated by said neural network during the calculation and said input data and/or said output data, and recording said part or all of the information in said external memory, wherein said part or all of the information represents a feature of said object related to said control data.

By establishing the association between said part or all of the information and said input data and/or said output data, it is possible to know the corresponding relationship between the data of an intermediate layer (intermediate data) and the corresponding input data and/or said output data, so that the user can grasp the information of the intermediate layer of the neural network and grasp how the neural network controls the robot, for further operations.

Wherein, establishing an association between said part or all of the information and said input data and/or said output data comprises at least one of: establishing an association between each input data and the information corresponding thereto; establishing an association between each class of input data and the information corresponding to that class of input data; and establishing an association between each class of information and the input data corresponding to that class of information. Thus, the general information of the same class of input data or the same class of information may be known, and thereby operations may be performed with respect to the same class of input data or the same class of information.

Wherein, recording part or all of the information in said external memory comprises: storing both said input data and said information according to a specific data structure; storing said information and said associations; processing and storing said information.

The method further may comprise: calculating the correlation of said part or all of the information with said input data; and visualizing the association, by representing, in a first manner, said information having a first correlation and/or said input data having an association with said information having the first correlation, and by representing, in a second manner, said information having a second correlation and/or said input data having an association with said information having the second correlation, wherein, said first manner is different from said second manner, and said first correlation is different from said second correlation.

The method further may comprise: according to the frequency of utilization of said part or all of the information, calculating the degree of importance of said part or all of the information; and by representing said information having a first degree of importance and/or said input data having an association with said information having the first degree of importance in a first manner and by representing said information having a second degree of importance and/or said input data having an association with said information having the second degree of importance in a second manner, visualizing the association, wherein, said first manner is different from said second manner, and said first degree of importance is different from said second degree of importance.

Thus, the user may intuitively know the input data and the intermediate data (comprising said part or all of the information), for example, from what input data unexpected intermediate data may be caused. As a result, the user may operate, according to the visible result, input data or intermediate data, for example, delete or replace non-expected intermediate data, to obtain a better output result.

Further, the method further may comprise: notifying a user of at least one of said information represented in said first manner and said information represented in said second manner.

Further, the method further may comprise at least one of: deleting or invalidating one of said information represented in said first manner and said information represented in said second manner; overwriting, with predetermined data, one of said information represented in said first manner and said information represented in said second manner; storing, into said external memory, information different from at least one of said information represented in said first manner and said information represented in said second manner.

Through the operations described above, the user may artificially modify the content in the internal memory, and thereby may change the memory of the neural network, to obtain an expected output result.

Further, the method further may comprise: causing said neural network re-learning.

According to an aspect of the embodiments of the present disclosure, there is provided a method for image recognition, using a neural network connected to an external memory to conduct image recognition, the method characterized by comprising inputting input data into said learned neural network to obtain output data through a calculation by said neural network, wherein said input data comprises an image about an object, and said output data represents an attribute of the object; and establishing an association between part or all of the information generated by said neural network during the calculation and said input data and/or said output data, and recording said part or all of the information in said external memory, wherein said part or all of the information represents a feature of said object related to said attribute.

Thus, when it is necessary to determine the attribute of the object in the production process (for example, the attribute indicates whether the object is a good product or a defective product), such determination may also be realized by using artificial intelligence technology that has utilized a neural network or the like to conduct image recognition of the object.

By establishing the association between said part or all of the information and said input data and/or said output data, it is possible to know the corresponding relationship between the data of the intermediate layer (intermediate data) and the corresponding input data and/or said output data, so that the user can grasp the information of the intermediate layer of the neural network and grasp how the neural network recognizes the object, for further operations.

According to an aspect of the embodiments of the present disclosure, there is provided a method for information processing, the method characterized by comprising: inputting input data into a learned neural network to obtain output data through a calculation by said neural network; establishing an association between part or all of the information generated by said neural network during the calculation and said input data and/or said output data, and recording said part or all of the information in an external memory connected to said neural network.

By establishing the association between said part or all of the information and said input data and/or said output data, it is possible to know the corresponding relationship between the data of the intermediate layer and the corresponding input data and/or output data, so that the user can grasp the information of the intermediate layer and grasp the operation situation of the neural network after the learning, for further operations. For example, the output data of the neural network can be changed by changing the intermediate data stored in the external memory, i.e., changing the memory of the neural network.

According to still another aspect of the embodiments of the present disclosure, there is further provided an apparatus for realizing the method described above.

According to yet another aspect of the embodiments of the present disclosure there is further provided a system for controlling a robot. The system may comprise: a processing unit that executes the method described above.

According to still another aspect of the embodiments of the present disclosure, there is further provided a program for controlling a robot, which, when executed, executes the method described above.

According to still another aspect of the embodiments of the present disclosure, there is further provided a storage medium having stored thereon a program which, when executed, executes the method described above.

Technical Effect

With the method, the apparatus, the system and the program for controlling a robot, the method for image recognition, and the storage medium, according to the embodiments of the present disclosure, the user can grasp the information of the intermediate layer, and grasp the operation situation of the neural network, for further operations. For example, unexpected output data of the neural network can be corrected.

In addition, the contents in the external memory can be visualized for clarity. As another example, the contents in the external memory can be operated to improve the learning situation or to correct the output result.

BRIEF DESCRIPTION OF THE DRAWINGS

The drawings described herein are used to provide a further understanding of the disclosure and constitute a part of the disclosure. The schematic embodiments of the disclosure and the descriptions thereof are used to explain the disclosure and do not constitute improper limitations to the disclosure. In the drawings.

DETAILED DESCRIPTION OF THE EMBODIMENTS

In order to help those skilled in the art better understand the present disclosure, the embodiments of the present disclosure are clearly and completely described below with reference to the accompanying drawings. Apparently, the described embodiments are merely some of the embodiments of the present disclosure, rather than all of them. All other embodiments obtained by those skilled in the art based on the embodiments of the present disclosure without creative efforts shall fall within the protection scope of the present disclosure.

In recent years, image recognition technology using a machine learning model like a neural network has been developed rapidly, and has been widely used in various technical fields. In order to deeply understand the operation mode of a machine learning model, the present disclosure explores the calculation process of the machine learning model during image recognition. In the present disclosure, in a learning phase of the machine learning model, it is possible to check intermediate data corresponding to learning data generated in the learning process, so as to know the learning data and the memory situation of the neural network, thereby to process the learning data, for example, to input more efficient learning data or delete inefficient learning data. In a working phase of the learned neural network, it is also possible to check intermediate data corresponding to input data and/or output data generated in the working process, so as to know the working situation of the neural network, and correct an improper output result by modifying intermediate data.

The abovementioned intermediate data can be processed and visualized so as to be conveniently checked by human, and thus the advantages of machine learning technology and human determination can be combined. There are many manners of processing and visualization, for example, the intermediate data can be filtered and classified, different categories of intermediate data can be represented by different colors, different forms, or in various other manners that people can distinguish, so that people can pay attention to a certain class of intermediate data.

In the present disclosure, people can directly operate, for example, delete, overwrite, invalidate, etc. the intermediate data of interest, so as to be able to change the learning or working process of the neural network, efficiently improve the performance thereof, and obtain a desired learning or working result.

First, the hardware structure of the system 100 for controlling a robot according to an embodiment of the present disclosure is described.

Figure 1A:
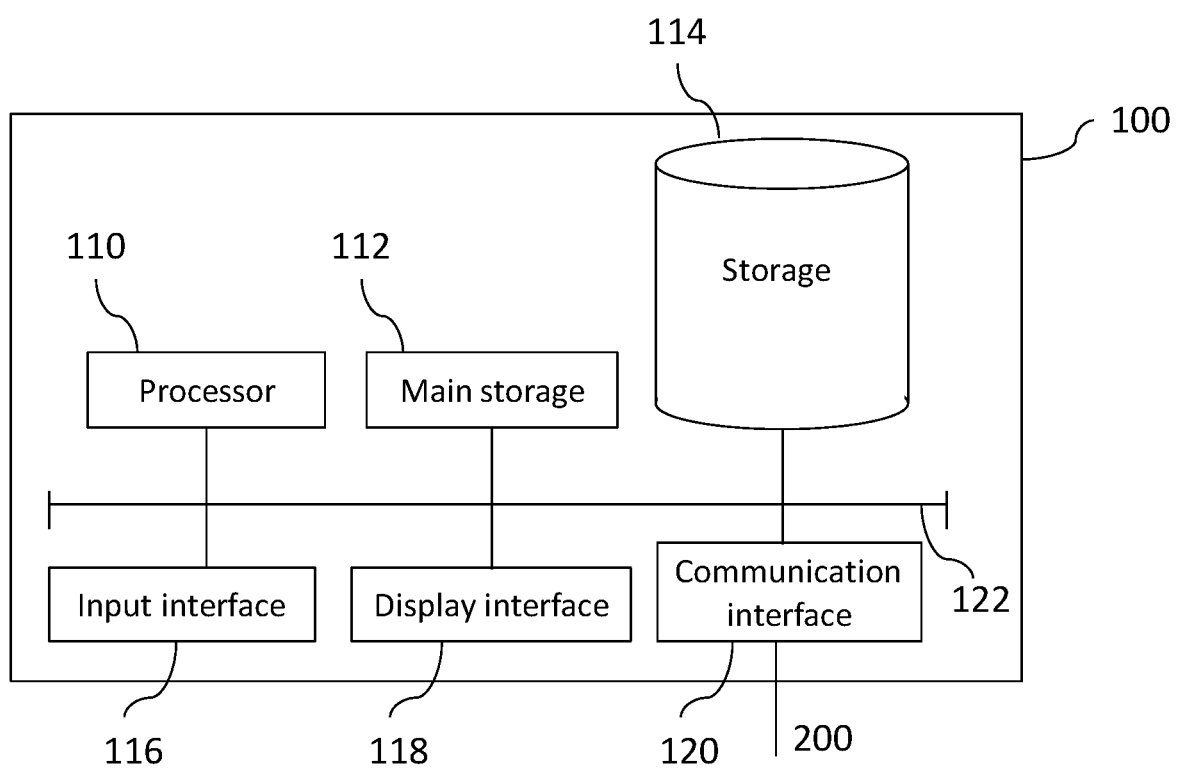
FIG. 1A is a mode diagram showing the hardware structure of a system for controlling a robot according to an embodiment of the present disclosure.

FIG. 1A is a mode diagram showing the hardware structure of the system 100 for controlling a robot according to an embodiment of the present disclosure. As shown in FIG. 1A, for example, the system 100 for controlling a robot may be implemented by a general purpose computer with general purpose computer architecture. The system 100 for controlling a robot may comprise a processor 110, a main storage 112, a storage 114, an input interface 116, a display interface 118, and a communication interface 120. These components may communicate with each other for example via an internal bus 122.

The processor 110 expands a program stored in the storage 114 on the main storage 112 to execute, thereby implementing the functions and processes described later. The main storage 112 may be formed by a volatile memory and functions as a work memory required by the processor 110 to execute the program.

The input interface 116 may be connected to an input portion such as a mouse or a keyboard, and receives an instruction inputted by the user via an operation input portion.

The display interface 118 may be connected to a display, and may output, to the display, various processing results generated by the processor 110 when executing the program.

The communication interface 120 is for communicating with a PLC, a database device, or the like through a network 200.

The storage 114 may store programs, such as a program for controlling a robot, an OS (Operating System), and the like, that can use a computer as the system 100 for controlling a robot.

The program for controlling a robot stored in the storage 114 may be mounted to the system 100 for controlling a robot by an optical recording medium such as a DVD (digital versatile disc) or a semiconductor recording medium such as a USB (universal serial bus) memory. Alternatively, the information processing program may also be downloaded from a server device or the like on the network.

The program for controlling a robot according to the present embodiment may also be provided in combination with other programs. In this case, the program for controlling a robot itself does not include the modules included in other programs that are combined in the above manner, but cooperates with other programs. In this manner, the program for controlling a robot according to the present embodiment may also be combined with other programs.

FIG. 1A shows an example of using a general-purpose computer to implement the system 100 for controlling a robot, but the present disclosure is not limited thereto, and all or a part of its functions may be implemented by a dedicated circuit such as an ASIC (application specific integrated circuit) or an FPGA (field-programmable gate array). In addition, a part of the processing of the system 100 for controlling a robot may also be performed on an external device connected to the network.

Figure 1B:
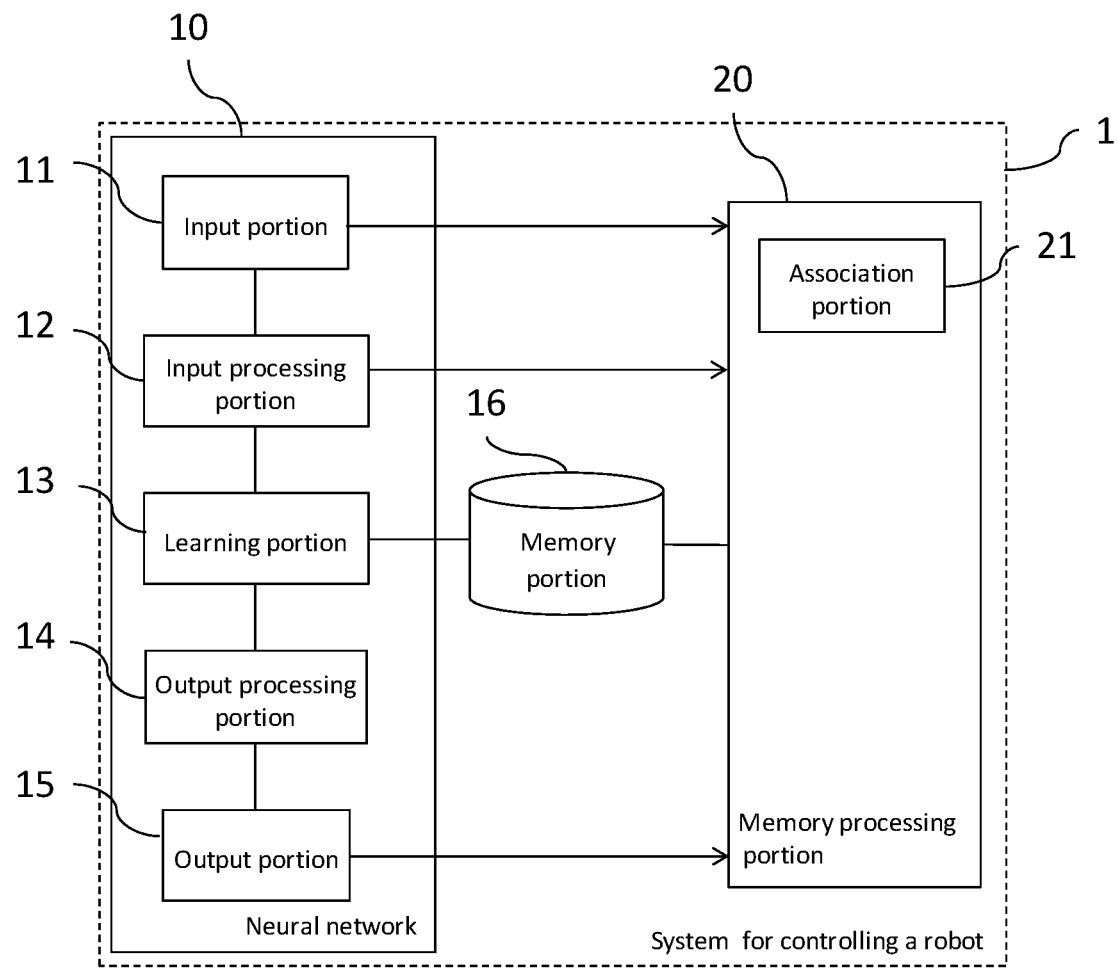
FIG. 1B is a block diagram of a system for controlling a robot according to the embodiment of the present disclosure.

FIG. 1B is a block diagram of a system for controlling a robot according to an embodiment of the present disclosure. As shown in FIG. 1B, the system 1 for controlling a robot may comprise a neural network 10, a memory portion 16 and a memory processing portion 20. The neural network 10 is used for generating a machine learning model, and may comprise an input portion 11, an input processing portion 12, a learning portion 13, an output processing portion 14 and an output portion 15. A memory portion 16 is electrically connected to the neural network 10. Alternatively, the memory portion 16 may also be a part of the neural network 10. Herein, the memory portion 16 is an instance of the "external memory" in the preset disclosure. The memory processing portion 20 is used for processing the memory in the memory portion 16, and may comprise an association portion 21.

The input portion 11 is used for inputting raw data such as learning data or input data that the neural network 10 inputs during a working phase. The learning data is inputted for the learning of the learning portion 13. In the working phase, the input data is inputted to obtain desired output data through a calculation by the learned learning portion 13. Examples of the learning data and the input data may be, for example, image data of a workpiece on a production line and the like. The learning data can be integrated with label data, and the label data may represent an attribute of the workpiece, for example whether the workpiece is a good product. As an instance, the output data may be for example control data of the robot, and the robot may handle the workpiece based on the control data, such as grab or put down the workpiece.

The input processing portion 12 is used for pre-processing the raw data inputted by the input portion 11. For example, raw data can be converted into n-dimensional vectors or matrices. The conversion manner is not specifically limited, and various manners in the prior art may be adopted as long as raw data is converted into a format that can be processed by the learning portion 13.

The learning portion 13 learns based on the pre-processed raw data received from the input processing portion 12 so as to generate a learned machine learning model. In the present disclosure, the description is given taking the neural network as an example, but the learning portion 13 may also learn in other machine learning manners.

The output processing portion 14 may convert the learning result of the learning portion 13 into the form of a final output. For example, during the learning of the control of a robot, the output processing portion 14 converts the learning result of the learning portion 13 into control instructions understandable by a robot controller. The output portion 15 is used for outputting output data that has been processed by the output processing portion 14.

The memory portion 16 is used for storing intermediate data generated by the learning portion 13 during the learning phase and/or the working phase, so that the neural network 10 may have a memory capability. In other words, some or all of the information in the memory portion 16 is generated through the learning or operation by the learning portion 13. The intermediate data may comprise, for example, the operation result of an intermediate layer of the neural network, or may comprise data (the data may be generated based on the calculation result of the intermediate layer) corresponding to the learning data or input data. As an instance, for example, during the learning of the identification of the class of a workpiece in an image, when the learning data or input data is image data, the data corresponding to the learning data or input data may be feature data of the workpiece, for example, the feature data may represent "rectangle", "circle" and the like. These features are related to the type of expected controls by the robot, for example, different operations are performed for workpieces of different shapes.

The memory portion 16 may be used to store said part or all of the information after the association is established. For example, in the association shown below with reference to FIG. 3, the memory portion 16 may store both the learning data Li and the intermediate data Mi ("i" is a natural number for indicating different memory spaces) in a list-wise data structure. Entries E30, E31 are entries in the list. Of course, the memory portion 16 may also be stored according to various other known data structures. There may be a plurality of memory slots in the memory portion 16 for storing each intermediate data Mi. For example, the memory portion 16 may be content-addressable or index-addressable.

Alternatively, in order to reduce the amount of stored data, the memory portion 16 may store only the intermediate data Mi and the association between the intermediate data Mi and the learning data Li corresponding thereto. The associations can be represented by means of lists, pointers, etc.

Alternatively, the intermediate data Mi stored in the memory portion 16 may be processed intermediate data. For example, Mi is classified according to a predetermined rule, and the values of Mi in the same class are modified to be the same value and stored, thereby further reducing the storage capacity and simplifying the subsequent analysis.

The memory processing portion 20 may receive raw data from the input portion 11 or receive processed raw data from the input processing portion 12. Alternatively, the memory processing portion 20 may receive output data from the output portion 15. The association portion 21 may establish an association between the raw data, the processed raw data, or the output data and part or all of the information memorized in the memory portion 16.

Figure 2:
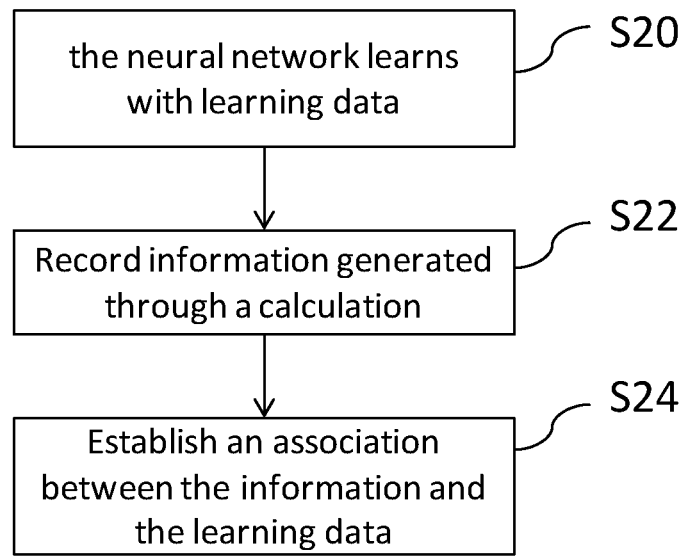
FIG. 2 is a flowchart of the method according to the embodiment of the present disclosure used in a learning phase of a neural network.

The operation performed by the association portion 21 will be described below in detail with reference to FIG. 2. FIG. 2 is a flowchart of the method according to the embodiment of the present disclosure used in a learning phase of a neural network.

As shown in FIG. 2, in step S20, the neural network 10 is learned with learning data. Such learning can be performed in various known machine learning manners. In addition, the neural network 10 may learn with both learning data and contents stored in the memory portion 16.

For example, during learning of the controlling of a robot, the learning data may comprise image data of a workpiece. And, for each image data, there may be corresponding label data, which may comprise, for example, control data of the robot, such as "grab", "drop" and the like. In addition, the label data may further include the class of the workpiece, information concerning whether the workpiece is a defective product or not, and the like. For example, a convolutional neural network (CNN) may be employed as the neural network 10 described above for learning, and the difference between the output data of the convolutional neural network and the label data is minimized by optimizing the loss function.

In step S22, part or all of the information generated through a calculation by the learning portion 13 is recorded in the memory portion 16. Said part or all of the information is equivalent to the memory produced by the learning portion 13 during the learning process. The memory can be used for subsequent learning, so as to speed up the learning. In addition, the memory can also be used to perform inference, deduction and other operations in the working phase, so that the neural network 10 has not only analytical capabilities but also inferential capabilities.

In step S24, the association portion 21 establishes an association between said part or all of the information and said learning data.

Figure 3:
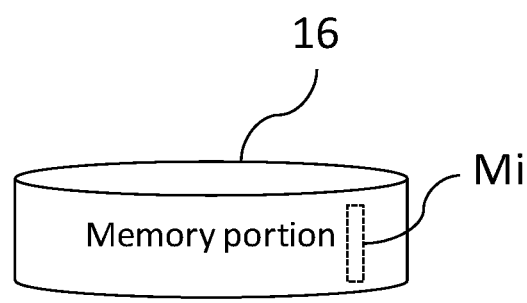
FIG. 3 is a diagram illustrating the result of the method according to the embodiment of the present disclosure used in the learning phase of the neural network.
Figure 3:
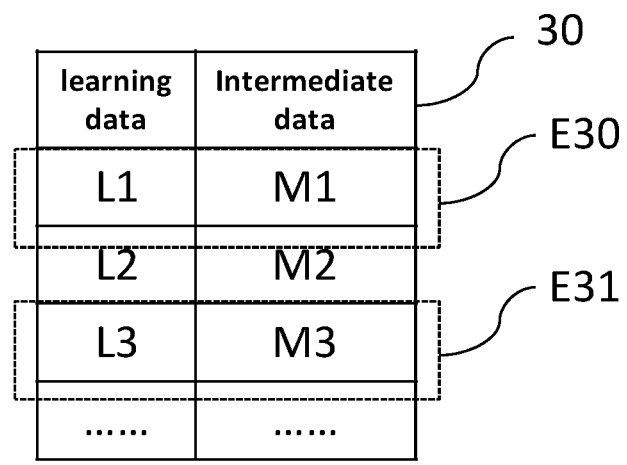

FIG. 3 is a diagram illustrating the result of the method according to the embodiment of the present disclosure used in the learning phase of the neural network, showing one example of the association. As shown in FIG. 3, Mi (i is a natural number) is an entry in said part or all of the information and may also be considered as an entry in the intermediate data, collectively referred to herein as "intermediate data".

In the case of a convolutional neural network, Mi can be, for example, a three-dimensional matrix of features for reflecting features such as outlines or colors, outputted by a certain intermediate layer, and as described later, the three-dimensional matrix can be patterned or digitized to reflect the corresponding features such as outlines or colors. For example, the output of a specific middle layer of the neural network 10 may be stored directly in the memory portion 16 or processed into data that directly reflects the features of the workpiece, and then stored in the memory portion 16.

In the association shown in FIG. 3, an association is established between each learning data L1, L2, L3, . . . and intermediate data M1, M2, M3, . . . corresponding thereto, as shown in a list 30. Thus, various analyses can be conveniently performed to grasp the learning process of the learning portion 13.

As another example, for example, during the learning of a robot on a pipeline, intermediate data M1, M2, M3, . . . , for example, may represent the shape features of the workpiece. Herein, assuming that the shape of the workpiece as a good product is a circle, intermediate data M1 corresponds to "oval", intermediate data M2 corresponds to "circle", intermediate data M3 corresponds to "oval", and so on. Therefore, it is possible to check, in a human inspection manner, whether the corresponding relationship between each learning data and the intermediate data corresponding thereto is appropriate or not.

Specifically, if the label data corresponding to learning data L1 comprises "defective product" and "the robot grabs the workpieces and drops it in the box of defective products" and intermediate data M1 is an "oval" rather than a "circle", the entry E30 is a desired result. For another example, if the label data corresponding to learning data L3 comprises "deviating from the transportation route" and "the robot grabs the workpiece and drops it on the correct transportation route", the corresponding intermediate data M3 is "oval", but in fact, due to the deviation from the transportation route, the workpiece in the image included in the learning data L3 shows only a semicircle, whereby the entry E31 is an undesirable result. Through such analysis, it is possible to know in detail how the learning portion 13 learns and whether the learning data is suitable for learning.

Alternatively, as another example, an association between each class of learning data and the information corresponding to that class of learning data may also be established. Specifically, the learning data may be divided into a plurality of categories in advance. For example, during the learning the detecting a quality of workpieces, the learning data may be classified in advance into a first class of learning data corresponding to a good product and a second class of learning data corresponding to a defective product. At this point, the intermediate data can represent "scratched", "color different" and so on. Thus, with respect to the first class of learning data, it is possible to know the distribution of the corresponding intermediate data, thereby improving the validity of the learning data accordingly.

Alternatively, the intermediate data may also be filtered and classified, and an association between each class of intermediate data and the learning data corresponding to that class of intermediate data may also be established. In this way, it is possible to know the distribution of the corresponding learning data, thereby improving the validity of the learning data accordingly.

Examples of the method according to the embodiment of the present disclosure used in the learning phase of the neural network are described above with reference to FIG. 2 and FIG. 3. Examples of the method according to the embodiment of the present disclosure used in the working phase of the neural network will be described below with reference to FIG. 4.

Figure 4:
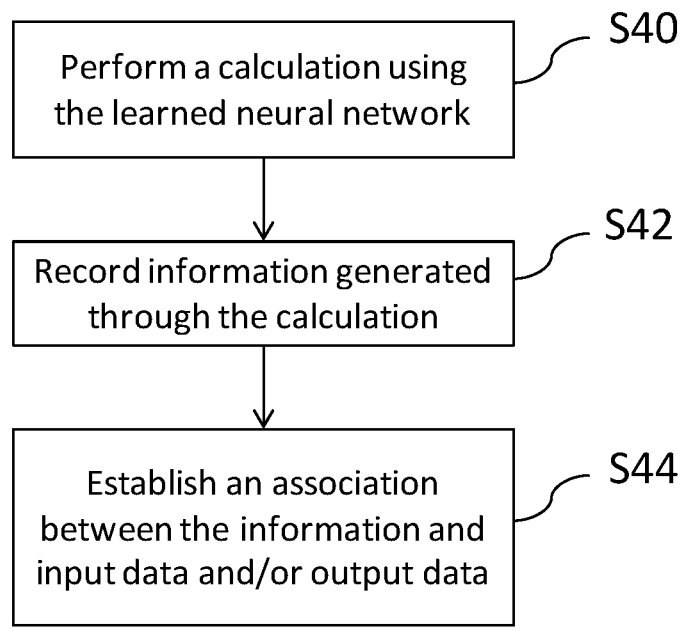
FIG. 4 is a flowchart of the method according to the embodiment of the present disclosure used in a working phase of the neural network.

FIG. 4 is a flowchart of the method according to the embodiment of the present disclosure used in the working phase of the neural network. As shown in FIG. 4, in step S40, the input data is inputted to the learned neural network 10, and the output data is obtained through an operation by the neural network 10. The working process can be carried out in various known machine learning manners.

In step S42, part or all of the information generated through a calculation by the learned learning portion 13 is recorded in the memory portion 16. Said part or all of the information may be intermediate data produced by the learning part 13 during the working phase, based on the input data.

Figure 5:
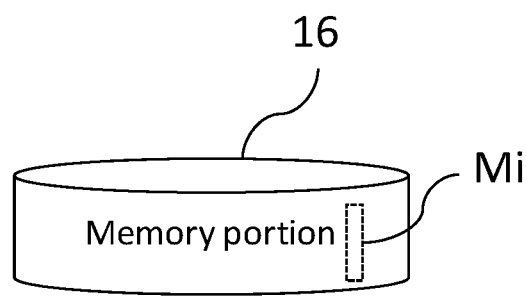
FIG. 5 is a diagram showing the result of the method according to the embodiment of the present disclosure used in the working phase of the neural network.

In step S44, the association portion 21 establishes an association between said part or all of the information and the input data and/or the output data. FIG. 5 is a diagram showing the result of the method according to the embodiment of the present disclosure used in the working phase of the neural network, showing an example of the association. As shown in FIG. 5, a one-to-one association is established between input data Ii, intermediate data Mi and output data Oi, for example, as shown by entry E50 in a list 50. Alternatively, it is also possible to establish an association only between input data Ii and intermediate data Mi, or to establish an association only between intermediate data Mi and output data Oi. Alternatively, it is also possible not to establish a one-to-one association, but as described above, an association between each class of input data Ii and intermediate data Mi, or an association between each class of intermediate data Mi and output data Oi may be established.

By establishing such association, it is possible to know the working process of the neural network 10. In the case where the working process is abnormal, it is possible to trace the intermediate calculation process to conveniently make corrections.

For example, in the working phase of a robot on a pipeline performing the operation of good/defective products, the neural network 10 that has learned generates control data according to the inputted image of a workpiece, and the robot controls the workpiece on the basis of the control data. For example, when a monitoring camera captures an image of a defective product, the robot grabs the workpiece and drops it in the box of defective products; and when captures a workpiece deviating from the transportation route, the robot grabs the workpiece and drops it on the correct transportation route. In this process, the image of the workpiece inputted into the neural network 10, the intermediate data generated from the calculation of the neural network 10, and the control data generated by the neural network 10 are stored in the memory portion 16.

After a certain times of determinations regarding the workpieces have been performed, the neural network 10 already has memories (the content stored in the memory portion 16). When a new image is received, the neural network 10 may perform an calculation on the new image to obtain new intermediate data, extract from the memory portion 16 the intermediate data that has a highest evaluation with respect to the new intermediate data, and generate control data regarding the new image on the basis of the output data (control data) corresponding to the intermediate data stored in the memory portion 16 that has the highest evaluation. For example, the described evaluation may be determined on the basis of the correlation with the new intermediate data and the use frequency of the intermediate data stored in the memory portion 16 and so on.

Therefore, the neural network 10 not only has an analytical capabilities, but also can make an inference on the basis of the existing memories.

Figure 6:
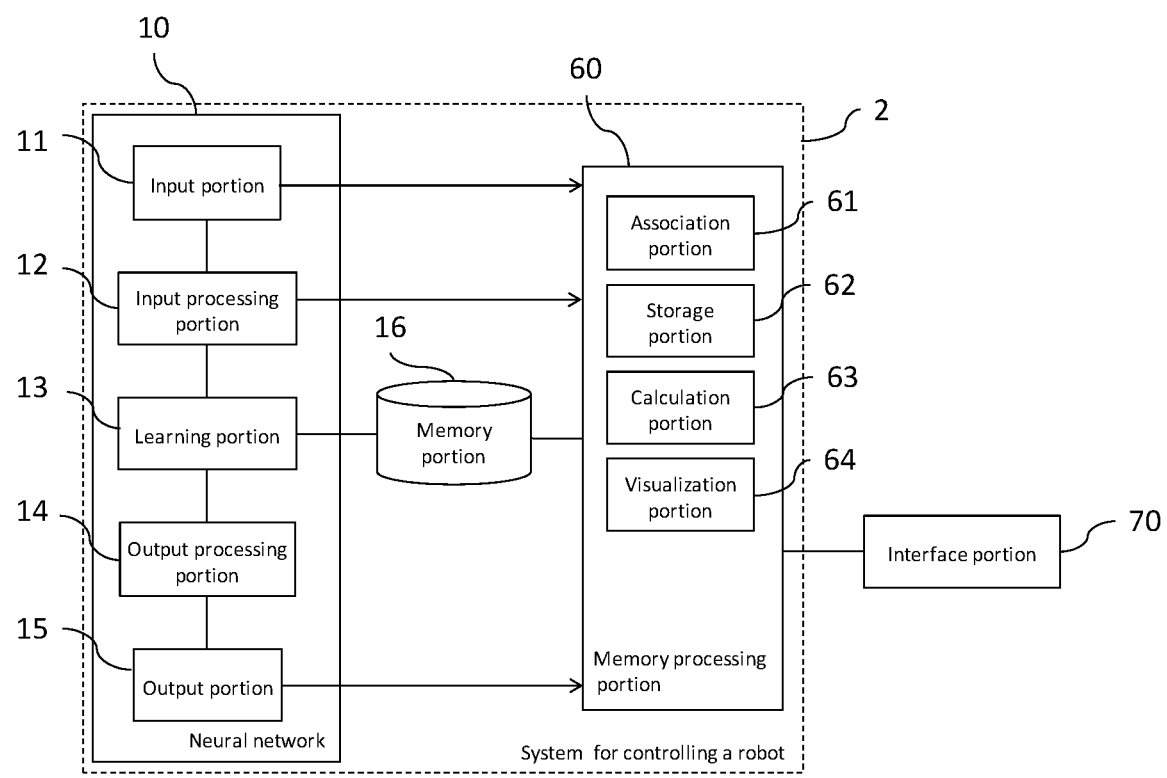
FIG. 6 is a block diagram of a system for controlling a robot according to another embodiment of the present disclosure.

FIG. 6 is a block diagram of a system for controlling a robot according to another embodiment of the present disclosure. The system 2 for controlling a robot shown in FIG. 6 is different from the system 1 for controlling a robot shown in FIG. 1B in a memory processing portion 60 and an interface portion 70. In FIG. 6, the same parts as those in FIG. 1B are denoted by the same reference signs, and the details thereof are not described herein again.

As shown in FIG. 6, the memory processing portion 60 may comprise an association portion 61, a storage portion 62, a calculation portion 63 and a visualization portion 64. The association portion 61 may have the same composition as that of the association portion 21 described above, and the details thereof are not described herein again.

The calculation portion 63 can perform various calculations based on intermediate data Mi. The visualization portion 64 may generate a visualization result based on the calculation result of the calculation portion 63 for the user's reference. It is noted that "visualization" herein is not limited to contents perceivable by the human eye, such as texts, images, animations, but may also be perceivable by other human senses, such as a prompt sound.

As an example, the calculation portion 63 may calculate the correlation of intermediate data Mi with input data Li corresponding thereto. Alternatively, the correlation of intermediate data Mi with output data Oi may also be calculated. For example, when a neural network that has learned is used to issue control data to a robot so as to select good workpieces and defective workpieces, intermediate data Mi can represent "scratched", "color different", "scratch-free", "no color difference" and so on. In this case, the correlation of intermediate data Mi representing "scratched" (a defective workpiece) with the corresponding output data Oi "grabs and drops it in the box of defective products" is large, whereas the correlation of intermediate data Mi representing "scratch-free" with corresponding output data Oi "grabs and drops it in the box of defective products" is small. As a specific method of calculating the correlation, for example, in the case where Mi is a three-dimensional matrix, the correlation may be calculated based on the product of Mi and a matrix representing the output data Oi.

The visualization portion 64 may represent in different manners, based on the correlation data calculated by the calculation portion 63, intermediate data Mi having different correlations. For example, intermediate data Mi having a correlation below a first threshold may be displayed as red on a display, and intermediate data Mi having a correlation exceeding a second threshold may be displayed as green on the display. Here, the second threshold is greater than the first threshold. In this way, the user can intuitively know the operation of the neural network 10. The manners in which the visualization portion 64 represents intermediate data Mi having different correlations are not specifically limited, as long as they enable the user to know intermediate data Mi having different degrees of correlation.

As another example, the calculation portion 63 may calculate the degree of importance of intermediate data Mi based on the frequency of utilization of intermediate data Mi. For example, when a learned neural network 10 is used to issue control data to a robot so as to select good workpieces and defective workpieces, intermediate data Mi can represent "scratched", "color different", "scratch-free", "no color difference" and so on. As described above, the neural network 10 outputs output data relating to the new image by using these intermediate data Mi stored in the memory portion 16. Intermediate data Mi utilized less frequently can be displayed as red on a display, and intermediate data Mi utilized frequently can be displayed as green on the display. In this way, the user can intuitively know the utilization condition of the intermediate data Mi, and know in which aspects the defective products have problems (for example, many scratches rather than size problems).

The interface portion 70 is used for notifying the user of at least one of intermediate data Mi represented in different manners to attract the user's attention. In FIG. 6, the interface portion 70 is shown as an individual part separate from the memory processing portion 60, and alternatively, the interface portion 70 may also be included in the memory processing portion 60. As an example of the interface portion, it may be a display, a speaker, or the like.

Figure 7:
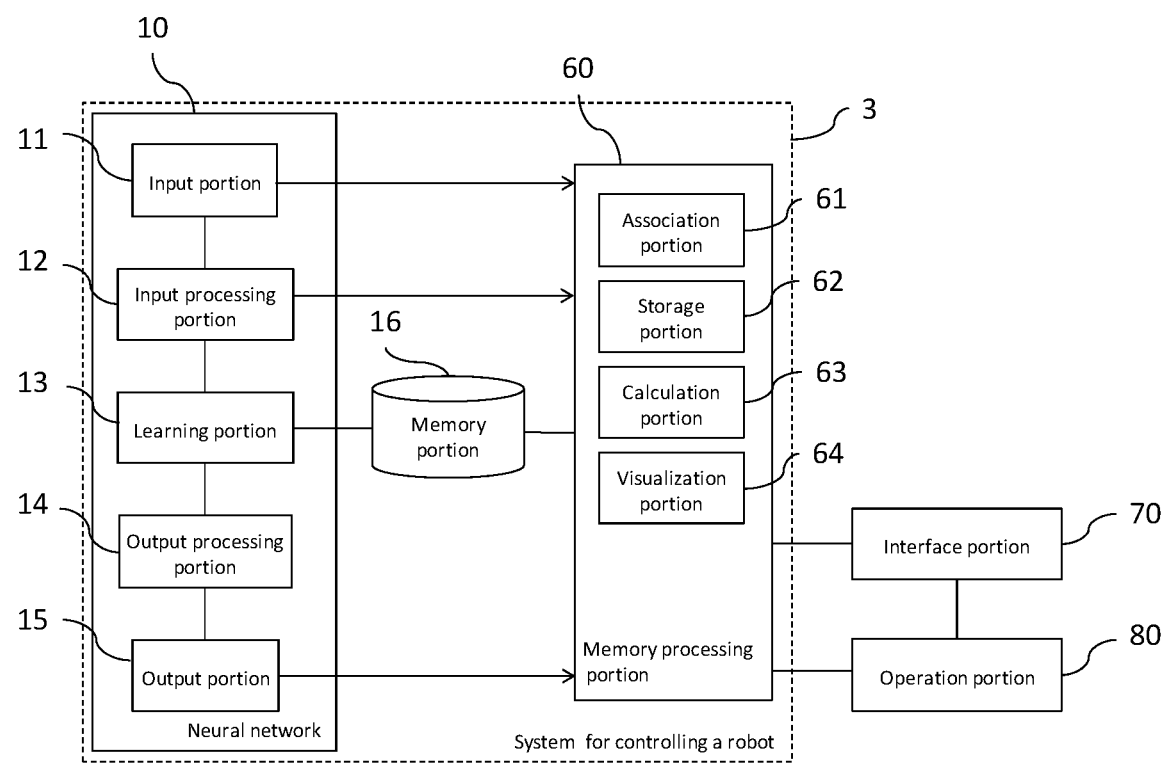
FIG. 7 is a block diagram of the system for controlling a robot according to the another embodiment of the present disclosure.

FIG. 7 is a block diagram of a system for controlling a robot according to still another embodiment of the present disclosure. The system 3 for controlling a robot shown in FIG. 7 is different from the system 1 for controlling a robot shown in FIG. 1B in the memory processing portion 60, the interface portion 70 and the operation portion 80. In FIG. 7, the same parts as those in FIG. 1B and FIG. 6 are denoted by the same reference signs, and the details thereof are not described herein again.

As shown in FIG. 7, the memory processing portion 60 is connected to the operation portion 80. The operation portion 80 is used for performing an operation such as addition, deletion, invalidation, etc. on the intermediate data in the memory portion 16 by means of the memory processing portion 60. In FIG. 7, the operation portion 80 is shown as an individual part separate from the memory processing portion 60, and alternatively, the operation portion 80 may also be included in the memory processing portion 60.

As an example of the operation performed by the operation portion 80, the user may delete or invalidate, through the operation portion 80 based on the visualized content outputted by the interface portion 70, the intermediate data that is stored in the memory portion 16 and represented in a specific manner, or overwrite, with predetermined data, the intermediate data that is stored in the memory portion 16 and represented in a specific manner, or write predetermined data into the memory portion 16; the predetermined data may be data different from the intermediate data represented in a specific manner. By directly modifying the memory contents of the memory portion 16 in this manner, and using the memory contents of the memory portion 16 for working of the neural network 10, the working process of the neural network 10 can be artificially influenced to obtain a better working result (or output data).

Figure 8:
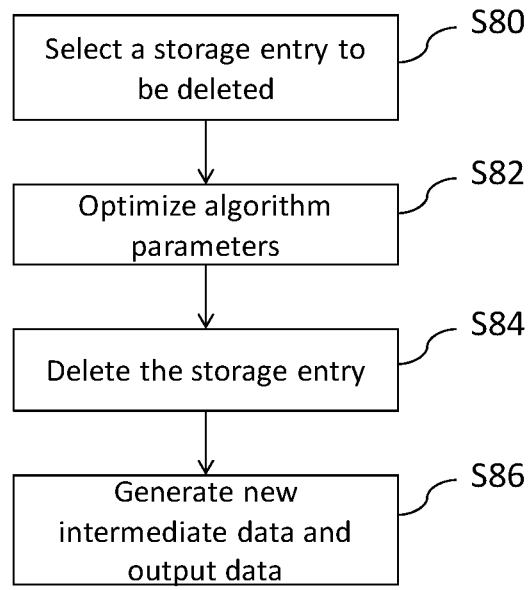
FIG. 8 is a flowchart of one example of the method according to the embodiment of the present disclosure.
Figure 9:
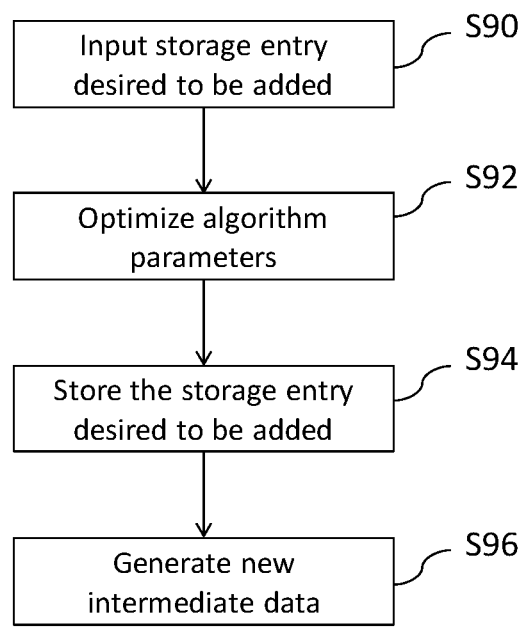
FIG. 9 is a flowchart of another example of the method according to the embodiment of the present disclosure.

An example of the operation performed by the operation portion 80 is described below with reference to FIG. 8 and FIG. 9. FIG. 8 is a flowchart of one example of the method according to the embodiment of the present disclosure, showing the operation performed by the operation portion 80 when deleting the contents in the memory portion 16. FIG. 9 is a flowchart of another example of a method according to the embodiment of the present disclosure, showing the operation performed by the operation portion 80 when adding a content into the memory portion 16.

As shown in FIG. 8, in step S80, the user selects, based on the visualized content outputted by the interface portion 70, a storage entry in the memory portion 16 that is desired to be deleted. For example, in the case of selecting workpieces, the storage entry corresponding to intermediate data Mi having a small correlation is selected.

In step S82, the neural network 10 learns by using the contents of the memory portion 16 other than the storage entry desired to be deleted and the learning data so as to optimize algorithm parameters. For example, operation parameters minimizing differences with the label data of the learning data may be determined. This step is optional and not necessary. This step may also be performed after step S84.

In step S84, the operation portion 80 access the memory portion 16, for example, in content-addressed or index-addressed manner, and deletes the storage item which is selected by the user and desired to be deleted.

In step S86, the neural network 10 performs a calculation to generate new intermediate data corresponding to the deleted storage entry, and the intermediate data is also stored in the memory portion 16. In addition, the neural network 10 may also generate a new output data corresponding to the new intermediate data and store it in the memory portion 16. The processes end.

As shown in FIG. 9, in step S90, the user inputs, based on the visualized content outputted by the interface portion 70, a storage entry desired to be added into the memory portion 16, for example, the output data corresponding to rarely occurred images may be used as a storage entry desired to be added (the output data may also be used as label data corresponding to the images) so as to improve the ability of the neural network 10 for handling rarely occurred situations.

In step S92, the neural network 10 learns by using the storage entry desired to be added, the contents of the memory portion 16 and the learning data so as to optimize algorithm parameters. For example, operation parameters minimizing errors with the label data of the learning data may be determined. This step is optional and not necessary. This step may also be performed after step S94.

In step S94, the operation portion 80 operates the memory portion 16, and stores, into the memory portion 16, the storage item desired to be added.

In step S96, the neural network 10 calculates, based on a newly added storage entry, the corresponding intermediate data. The intermediate data may also be stored in the memory portion 16. The processes end.

As described above with reference to FIG. 8 and FIG. 9, the memory processing portion 60 can operate the contents in the memory portion 16 through the operation portion 80, so as to change the memory of the neural network 10 in order to change the output data corresponding to specific input data during the working process thereof.

Figure 10:
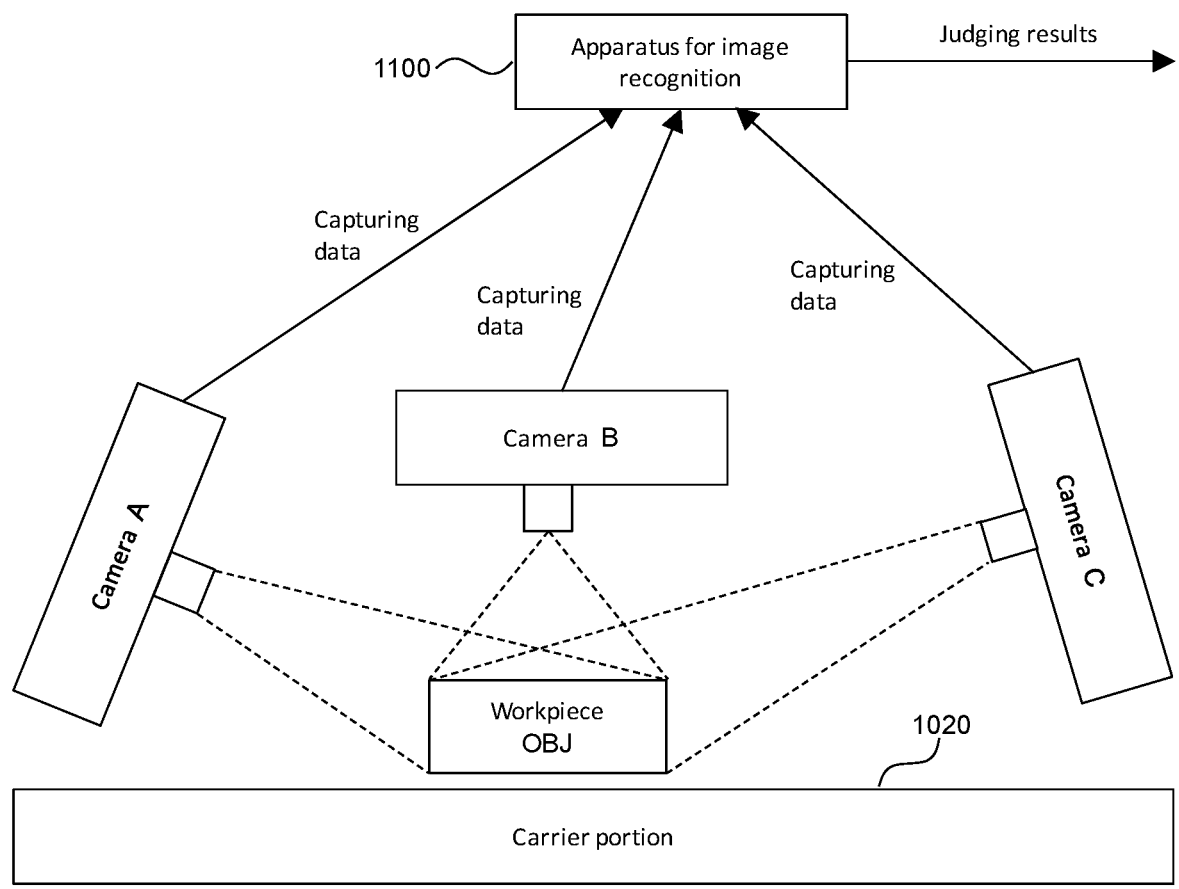
FIG. 10 is a schematic diagram showing an apparatus for image recognition according to the embodiment of the present disclosure.

FIG. 10 is a schematic diagram showing an apparatus for image recognition according to an embodiment of the present disclosure. As shown in FIG. 10, a workpiece OBJ on a carrier portion 1020 is captured using a camera A, a camera B, and a camera C to acquire image data. The apparatus 1100 for image recognition determines the quality of the workpiece OBJ based on the image data and the learning result.

In this application example, the apparatus 1100 for image recognition uses learning data for the learning of the neural network, and uses the learned neural network to determine the quality of the workpiece OBJ (an example of the attribute of the workpiece OBJ). The learning data comprises, for example, the images of the workpiece OBJ taken by the camera A, the camera B, and the camera C, and has label data indicating whether the workpiece OBJ is a good product or a defective product. The intermediate data generated during the learning and operation of the neural network can for example be recorded in an external memory, and the intermediate data can represent, directly or after conversion, the characteristics of the workpiece OBJ, for example, color, size, presence or absence of scratches, etc., or represent the probabilities corresponding to these features. The apparatus 1100 for image recognition may establish the association between the intermediate data and the corresponding learning data and store the association as an associated data group.

This associated data group can be displayed to the user in a textual manner so that the user can know which features in the images of the workpiece OBJ, being a good product or a defective product, can be identified and which features play a role in determining the advantages and disadvantages of the workpiece OBJ. Also, for the learning data that is easy to be misjudged, the learning of the features in the learning data can be added in a targeted way to improve the determination ability of the neural network.

All or part of the memory processing portions 10, 60, the systems 1, 2, 3 for controlling a robot and the apparatus 1100 for image recognition may be realized in the form of software functional units. When sold or used as independent products, the software functional units may be stored in a computer-readable storage medium. Based on this understanding, the technical solution of the present disclosure essentially, or the part contributing to the prior art, or all or part of the technical solution may be implemented in the form of a software product stored in a storage medium, comprising several instructions that cause one computer device (which may be a personal computer, a server, a network device, etc.) to perform all or part of the steps of the method according to each instance of the present disclosure. The foregoing storage medium comprises various media capable of storing program code such as a USB disk, a read-only memory (ROM), a random access memory (RAM), a mobile hard disk, a magnetic disk, or an optical disk, and may also comprise data streams that can be downloaded from a server or cloud.

The forgoing are merely the preferred embodiments of the present disclosure, and it should be noted that those skilled in the art may make some improvements and modifications without departing from the principle of the disclosure. These improvements and modifications should be regarded to fall within the scope of protection of the present disclosure.

The invention claimed is:

1. A method for controlling a robot, using a neural network connected to a memory device to conduct the controlling of said robot, the method characterized by comprising:

inputting input data into the learned neural network to obtain output data through a calculation by said neural network, wherein said input data comprises an image about an object, said output data comprises control data about said robot, and said robot controls said object based on said control data;

establishing an association between part or all of intermediate data generated by said neural network during the calculation and said input data and/or said output data, and recording said part or all of the intermediate data in said memory device, wherein said part or all of the intermediate data represents a corresponding relationship between said object and said control data, wherein the intermediate data comprises a calculation result of an intermediate layer of the neural network and data generated based on the calculation result of the intermediate layer corresponding to the input data;

calculating the correlation of said part or all of the intermediate data with said input data; and visualizing the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

2. The method for controlling the robot according to claim 1, wherein, establishing an association between said part or all of the intermediate data and said input data and/or said output data comprises at least one of:

establishing an association between each input data and the intermediate data corresponding thereto;

establishing an association between each class of input data and the intermediate data corresponding to that class of input data;
establishing an association between each class of intermediate data and the input data corresponding to that class of intermediate data.

3. The method for controlling the robot according to claim 1, wherein, recording said part or all of the intermediate data in said memory device comprises:
storing both said input data and said intermediate data based on a list-wise data structure;
storing said intermediate data and said association;
processing and storing said intermediate data.

4. The method for controlling the robot according to claim 1, further comprising:
according to the frequency of utilization of said part or all of the intermediate data, calculating the degree of importance of said part or all of the intermediate data; and
visualizing the association, by representing said intermediate data having a first degree of importance and/or said input data having an association with said intermediate data having the first degree of importance in a first manner and by representing said intermediate data having a second degree of importance and/or said input data having an association with said intermediate data having the second degree of importance in a second manner, wherein, said first manner is different from said second manner, and said first degree of importance is different from said second degree of importance.

5. The method for controlling the robot according to claim 1, further comprising:
notifying a user of at least one of said intermediate data represented in said first manner and said intermediate data represented in said second manner.

6. The method for controlling the robot according to claim 1, further comprising at least one of:
deleting or invalidating one of said intermediate data represented in said first manner and said intermediate data represented in said second manner;
overwriting, with predetermined data, one of said intermediate data represented in said first manner and said intermediate data represented in said second manner;
storing, into said memory device, intermediate data different from at least one of said intermediate data represented in said first manner and said intermediate data represented in said second manner.

7. The method for controlling the robot according to claim 6, further comprising:
causing said neural network relearning.

8. A method for image recognition, using a neural network connected to a memory device to conduct image recognition, the method characterized by comprising:
inputting input data into the learned neural network to obtain output data through a calculation by said neural network, wherein said input data comprises an image about an object, and said output data represents an attribute of the object;
establishing an association between part or all of intermediate data generated by said neural network during the calculation and said input data and/or said output data, and recording said part or all of the intermediate data in said memory device, wherein said part or all of the intermediate data represents a corresponding relationship between said object and said attribute, wherein the intermediate data comprises a calculation result of an intermediate layer of the neural network and data generated based on the calculation result of the intermediate layer corresponding to the input data;
calculating the correlation of said part or all of the intermediate data with said input data; and
visualizing the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

9. A method for information processing, the method characterized by comprising:
inputting input data into a learned neural network to obtain output data through a calculation by said neural network;
establishing an association between part or all of intermediate data generated by said neural network during the calculation and said input data and/or said output data, and recording said part or all of the intermediate data in a memory device connected to said neural network, wherein the intermediate data comprises a calculation result of an intermediate layer of the neural network and data generated based on the calculation result of the intermediate layer corresponding to the input data;
calculating the correlation of said part or all of the intermediate data with said input data; and
visualizing the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

10. An apparatus for controlling a robot, characterized by comprising:
a memory device; and
a processor coupled to the memory device and configured to:
input data into a neural network to obtain output data through a calculation by said neural network, wherein said input data comprises an image about an object, said output data comprises control data about said robot, and said robot controls said object based on said control data;
establish an association between part or all of intermediate data generated by said neural network during the calculation and said input data and/or said output data, and recording said part or all of the intermediate data in said memory device, wherein said part or all of the intermediate data represents a corresponding relationship between said object and said control data, wherein the intermediate data comprises a calculation result of an intermediate layer of the neural network and data generated based on the calculation result of the intermediate layer corresponding to the input data;
calculate the correlation of said part or all of the intermediate data with said input data; and
visualize the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

11. The apparatus for controlling the robot according to claim 10, wherein the processor is further configured to:
calculate the degree of importance of said part or all of the intermediate data according to the frequency of utilization of said part or all of the intermediate data; and
visualize the association, by representing said intermediate data having a first degree of importance and/or said input data having an association with said intermediate data having the first degree of importance in a first manner and, by representing said intermediate data having a second degree of importance and/or said input data having an association with said intermediate data having the second degree of importance in a second manner, wherein, said first manner is different from said second manner, and said first degree of importance is different from said second degree of importance.

12. An apparatus for image recognition, characterized by comprising:
a memory device; and
a processor coupled to the memory device and configured to:
input data into a neural network to obtain output data through a calculation by said neural network, wherein said input data comprises an image about an object, and said output data represents an attribute of the object; and
establish an association between part or all of intermediate data generated by said neural network during the calculation and said input data and/or said output data, and recording said part or all of the intermediate data in said memory device, wherein said part or all of the intermediate data represents a corresponding relationship between said object and said attribute, wherein the intermediate data comprises a calculation result of an intermediate layer of the neural network and data generated based on the calculation result of the intermediate layer corresponding to the input data;
calculate the correlation of said part or all of the intermediate data with said input data; and
visualize the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

13. An apparatus for information processing, characterized by comprising:
a memory device; and
a processor coupled to the memory device and configured to:
input data into a neural network to obtain output data through a calculation by said neural network; and
establish an association between part or all of intermediate data generated by said neural network during the calculation and said input data and/or said output data, and recording said part or all of the intermediate data in said memory device, wherein the intermediate data comprises a calculation result of an intermediate layer of the neural network and data generated based on the calculation result of the intermediate layer corresponding to the input data;
calculate the correlation of said part or all of the intermediate data with said input data; and
visualize the association, by representing, in a first manner, said intermediate data having a first correlation and/or said input data having an association with said intermediate data having the first correlation, and by representing, in a second manner, said intermediate data having a second correlation and/or said input data having an association with said intermediate data having the second correlation, wherein, said first manner is different from said second manner, and said first correlation is different from said second correlation.

14. A system for controlling a robot, characterized by comprising: a processing unit that executes the method according to claim 1.

15. A non-transitory computer readable storage medium, characterized by having stored thereon a program which, when executed, executes the method according to claim 1.

16. The method for controlling the robot according to claim 4, further comprising:
notifying a user of at least one of said intermediate data represented in said first manner and said intermediate data represented in said second manner.

17. The method for controlling the robot according to claim 4, further comprising at least one of:
deleting or invalidating one of said intermediate data represented in said first manner and said intermediate data represented in said second manner;
overwriting, with predetermined data, one of said intermediate data represented in said first manner and said intermediate data represented in said second manner;
storing, into said memory device, intermediate data different from at least one of said intermediate data represented in said first manner and said intermediate data represented in said second manner.

* * * * *